May 23, 1950     A. H. KELCH, JR     2,508,398
FOLDING BABY CARRIAGE
Filed Jan. 6, 1947     2 Sheets-Sheet 1
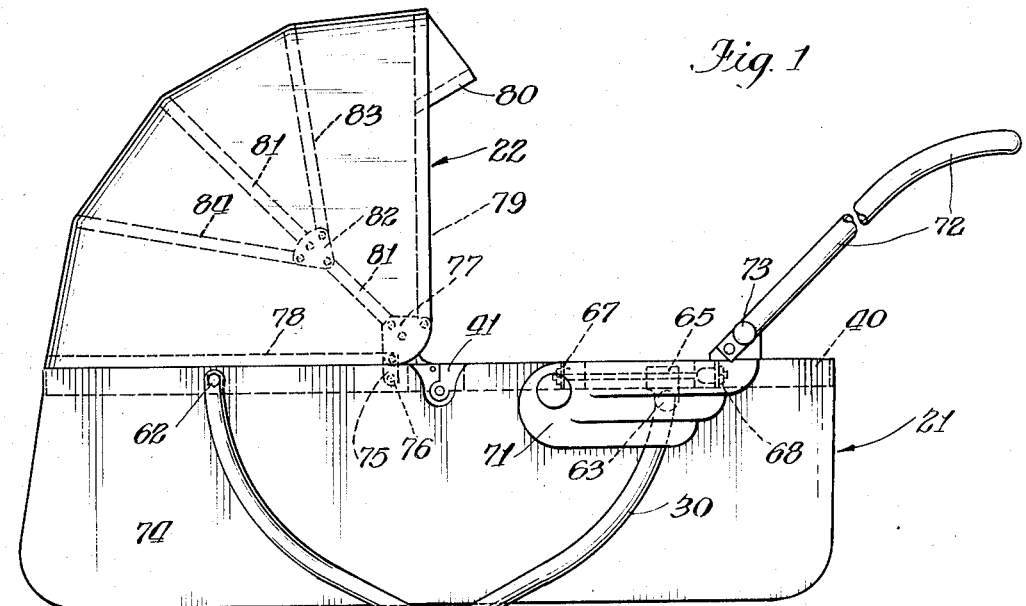
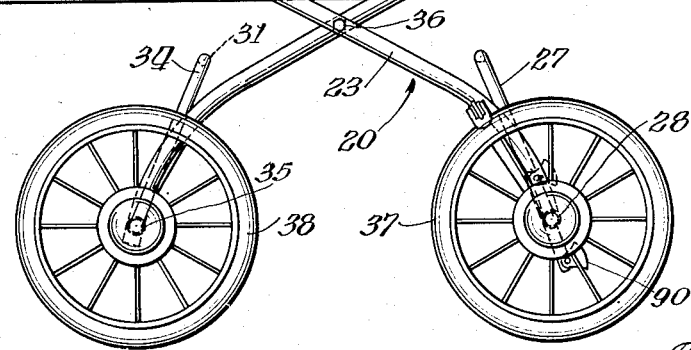
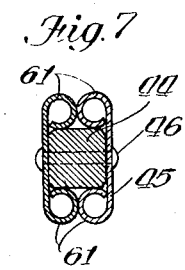
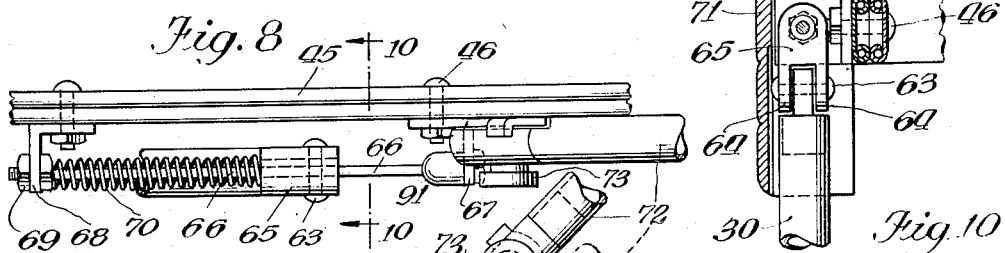
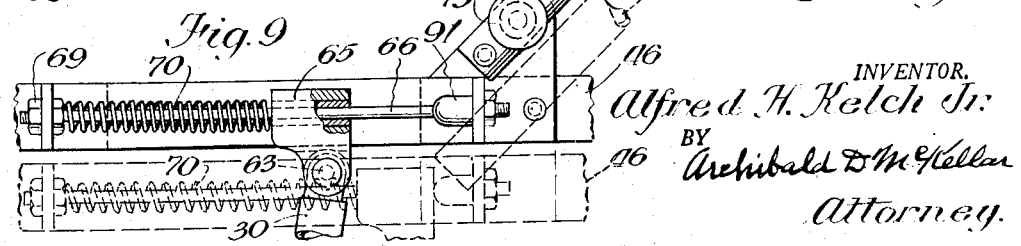
INVENTOR.
Alfred H. Kelch Jr.
BY Archibald D. McKellar
Attorney.

May 23, 1950 — A. H. KELCH, JR — 2,508,398
FOLDING BABY CARRIAGE
Filed Jan. 6, 1947 — 2 Sheets-Sheet 2
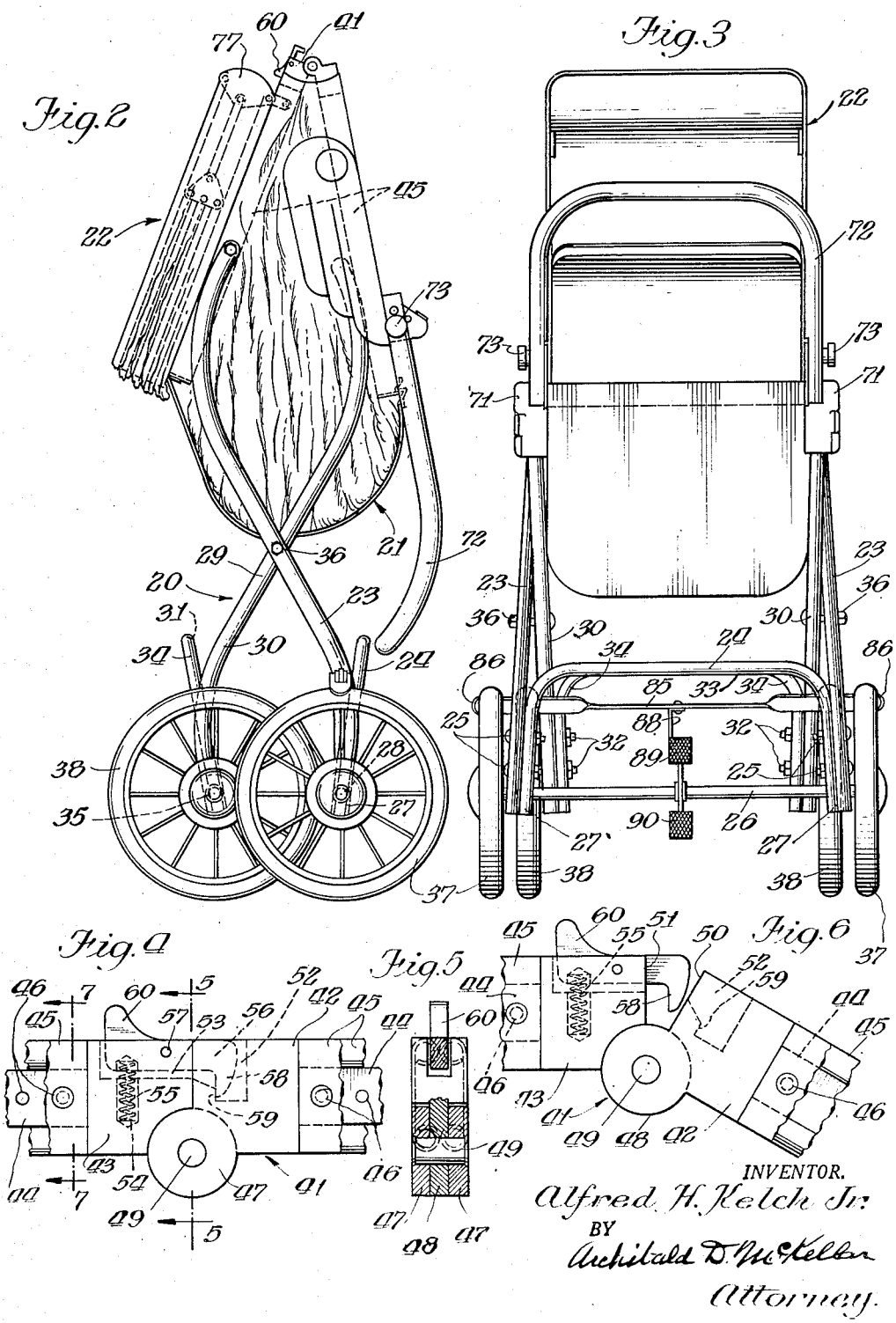

Patented May 23, 1950

2,508,398

UNITED STATES PATENT OFFICE 2,508,398

FOLDING BABY CARRIAGE

Alfred H. Kelch, Jr., Chicago, Ill.

Application January 6, 1947, Serial No. 720,432

5 Claims. (Cl. 280—41)

The invention relates to vehicles of the perambulator type, having a body carried by a frame mounted on wheels, but particularly to vehicles of this type having a collapsible body and frame. The invention has for its objects the provision of a vehicle of this type which is simple of construction, economical to manufacture and highly efficient in use.

Other objects will appear hereinafter.

The invention consists in the combinations and arrangements of parts hereinafter described and claimed.

The invention will be best understood by reference to the accompanying drawings forming a part of this specification, and in which Figure 1 is side elevation of a vehicle embodying the invention arranged in open position for use;

Figure 2 is a side view of the said vehicle in collapsed position arranged for storage;

Figure 3 is an elevation view from the operator's side, in open position for use;

Figure 4 is an enlarged side view partly in section of the hinge of the body frame in latched position;

Figure 5 is a section taken on line 5—5 of Figure 4;

Figure 6 is a side view of the hinge shown in Figure 4 in unlatched position;

Figure 7 is a section taken on line 7—7 of Figure 4;

Figure 8 is a top plan view of a fragmentary portion of the body frame equipped with means for yieldably attaching a supporting frame member and the handle for the operator;

Figure 9 is a dual side view of Figure 8, illustrating the movement of parts attaching the supporting frame with the body frame; and Figure 10 is a section of Figure 8, taken on line 10—10 of Figure 8.

The embodiment of the invention illustrated in the drawings and comprehensibly shown in Figures 1, 2 and 3 conceives such a vehicle having a horizontally folding frame 20, a foldable body 21 and a collapsible top 22. The supporting frame 20 comprises an outer frame unit having two S-shaped standards 23 held in spaced relation by an inverted U-shaped brace 24 at the bottom ends of said standards 23 by suitable bolts 25. A reinforcing tube 26 is arranged between the downwardly projecting arms 27 of the brace 24 and serves to hold the standards 23 in desired vertical alignment. An axle 28 extending through suitable holes in the bottom ends of the standards 23 and arms 27 has its projecting ends equipped with conventional rubber tired wheels 37, suitable for such vehicles. The supporting frame 20 further comprises an inwardly arranged companion frame unit 29 having two S-shaped standards 30, and an inverted U-shaped brace 31 attached to the bottoms of said standards 30 by suitable bolts 32. A reinforcing tube 33 is arranged between the arms 34 thereof. An axle 35 is mounted through the bottoms of the standards 30, the arms 34 and the reinforcing tube 33 and is also equipped with wheels 38 which are similar to those on the other companion frame. The standards 23 and 30 are pivotally connected intermediate their ends by suitable bolts 36, allowing the inner and outer units to be spread or drawn together, as desired.

Referring to Figures 2 and 3, it is to be noted that the wheels 37 carried by the standards 23 overlap the wheels 38 on the standards 30, thereby permitting a more compact folding arrangement.

The foldable body 21 comprises a rectangular frame 40 having two opposed U-shaped portions 45 hingedly connected by suitable one-way hinges 41, as best shown in Figures 4 and 6. Each of the hinges 41 comprises two companion members 42 and 43 having similar shank portions 44 which are adapted to fit in the ends of the U-shaped frame portions 45, where they are secured by suitable rivets 46, as best shown in Figures 4, 6 and 7. The hinge body member 42 is provided with two disc like projections 47 spaced and adapted to pivotally engage a similarly shaped projection 48 carried by the hinge body member 43 on the hinge pin 49, the projection 48 passing between the projections 47 and limited in movement by the abuttable contact flanges 50 and 51 of the body members 42 and 43. An aligned latching mechanism is arranged in the upper central part of the body members 42 and 43 in suitable recesses 52 and 53 respectively. The recess 53 is provided with a well 54 into which is placed an expansion spring 55 and in contact therewith is a latch lever 56 pivotally mounted on a pin 57. The latch lever 56 is provided with a downwardly projecting jaw 58 positioned and adapted to engage a ledge 59 in the recess 52. The opposite end of the latch lever 56 is provided with a thumb knob 60 by which it may be manually released from engagement. The U-shaped portions 45 of the frame 40, as best shown in Figure 7, are constructed of inner and outer flat units in strip form, having tubular bead-like edges 61 arranged bead to bead and held in rigid alignment by rivets 46. By this arrangement a very light and strongly built frame is provided which is highly essential for a vehicle of this kind.

The body frame 40 is attached to the upper ends of each standard 23 by suitable bolts 62 directly attached thereto and on which the said standards 23 are movable, as best shown in Figures 1 and 2. Each of the standards 30 of the inner supporting frame unit are attached at their upper pivot ends by a suitable pivot 63 carried between downwardly projecting flanges 64, forming a part of slidable carriage 65. The carriage 65 rides on a supporting guide bar 66 mounted between outwardly projecting lugs 67 and 68 attached to one U-shaped portion 45 on opposite sides thereof, as will be readily understood. The supporting guide bar 66 is mounted between the lugs 67 and 68 through suitably placed holes therein and adjusted and secured by the threaded nuts 69. A tension spring 70 is attached at one of its ends to the lug 68 by suitable means and its other end affixed to the slidable carriage 65. By this arrangement if an additional weight is effected a downward movement of the frame 40 will put the spring 70 in greater yet yieldable tension by moving the outer ends of the standards 23 and 30 apart, thus providing a simple and effective means for giving a springlike action to the body 20. An ornamental as well as effective cover 71 shields the slidable connection of the standards 30 and its associated mechanism from accidental interruption to the motion of the action of the spring 70 or injury to the hands of the user.

A conventional handle 72 has the outer ends of its arms adjustably attached to a bracket formed integrally with the lug 67 and is set and released by the pull button mechanism 73. The bag structure 74 of the body 21 may be of any practical shape but preferably of a shape similar to that shown in Figure 1. However, it is advisable that a plastic coated fabric be used and that it be attached to the frame 40 by suitable hems.

The top 22 is attached to a frame portion 45 of the frame 40 by suitable lugs 75 mounted adjacent the hinges 41 by rivets 76. To the upper ends of the lugs 75 a spider plate 77 is pivotally mounted, as is also a lower bow 78. A front bow 79 is movably attached to the forward and upper part of the spider plate 77 and carries a visor bow 80 which, when folded, is parallel with its supporting bow 79. An intermediate bow 81 is attached to a central part of the spider plate 77 on which is an auxiliary spider plate 82, to which is attached on opposite sides thereof the shorter bows 83 and 84. The cover material of the top 22 is preferably a transparent sheet of plastic fabric.

A toggle action brake, having a brake beam 85, comprising outwardly projecting blade portions with overhanging gripping lips 86 on each end, is so mounted that a distortion of its center portion 87 will cause the lips 86 to grip the outer sides of the tires and prevent the wheels 37 from rotating, as will be readily understood. A lever 88 is attached, as shown in Figure 3, at practically its center to the reinforcing tube 26 and is provided at its ends with treadles 89 and 90. By pushing the treadle 89 forwardly, the toggle connection is thrown into engagement, and by pressing on the treadle 90 the brake is released.

While I have illustrated and described a form of construction for carrying my invention into effect, this is capable of many variations and modifications without departing from the spirit of the invention; I therefore do not wish to be limited by the precise details set forth, but desire to avail my self of such forms and arrangements as may fall within the spirit and scope of the appended claims.

I claim:

1. In a vehicle of the class described comprising two supporting units; means pivoting said units for vertical movement; a vertical folding body frame pivotally carried by said supporting units; means for releasably latching said body frame in open position each of said units being provided with an inverted U-shaped brace; a tubular reinforcing member arranged between the arms of each of said U-shaped members; and an axle projected through said tubular reinforcing members, the arms of said U-shaped members, and the vertical members of said unit; there being aligned holes to receive said axle.

2. The construction specified in claim 1 in which one of the two supporting units is provided with a carriage hingedly connected to each of its upper ends; a guide bar rigidly attached to each side of the body frame; and a spring mounted on said guide bar between said carriage and a supported end of said guide bar.

3. A vehicle frame for a baby carriage having a plurality of vertical standards comprising two supporting units pivotally connected intermediate their ends; U-shaped means arranged at their lower ends of said units adapted to hold said standards in parallel and spaced relation; a body frame pivotally mounted adjacent one of its ends to the upper end of each standard of one supporting unit; a carriage pivotally mounted at the upper end of each standard of the other supporting unit in parallel relation to the pivotal mounting of said two supporting units; outwardly extending lugs mounted in spaced relation on opposite sides of and adjacent the other end of said body frame; a guide bar mounted on and between said lugs at each side of said body frame, both of said carriages slidably mounted on each of said guide bars arranged and adapted to yieldably control the two supporting units.

4. The construction specified in claim 3 in which the said body frame is provided with a jack-knife hinge to facilitate the close folding thereof.

5. The construction specified in claim 3 in which the said body frame is provided with a jack knife hinge in combination with a spring-held manually releasable latch member.

ALFRED H. KELCH, Jr.

REFERENCES CITED

The following references are of record in the file of this patent:

UNITED STATES PATENTS

| Number | Name | Date |
|---|---|---|
| 1,631,498 | Melniker | June 7, 1927 |
| 1,633,864 | Klingelsmith | June 28, 1927 |
| 1,753,931 | Lewis | Apr. 8, 1930 |

FOREIGN PATENTS

| Number | Country | Date |
|---|---|---|
| 554,184 | France | June 3, 1923 |
| 588,060 | France | Apr. 29, 1925 |